Aug. 5, 1969
C. R. STONE
3,460,082
ELECTRICAL RELAY WITH ENCLOSURE CONNECTED
TO THE MOTOR STRUCTURE THEREOF
Filed Feb. 20, 1967
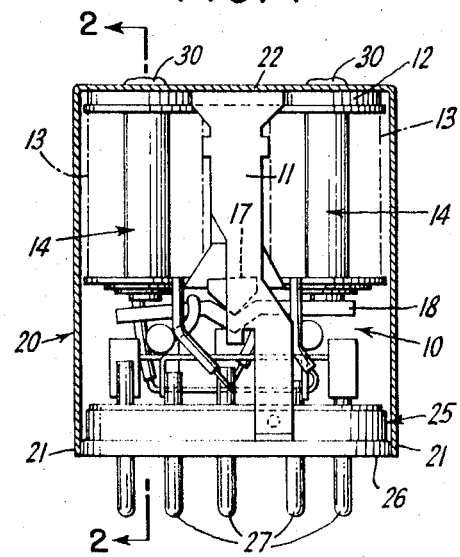
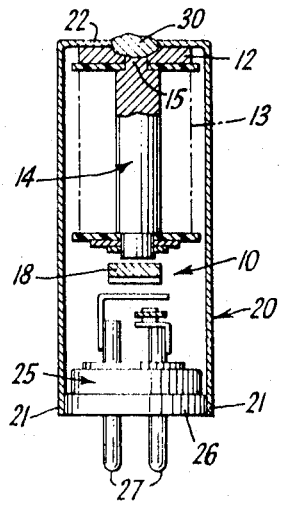
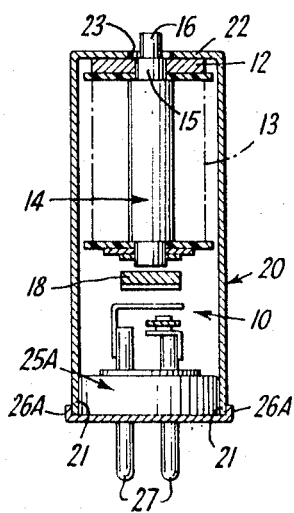
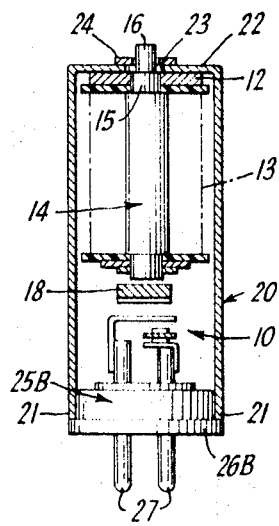
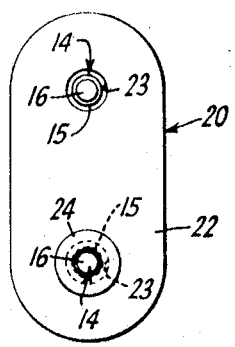
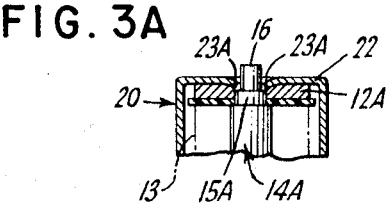
INVENTOR.
CLARENCE ROBERT STONE
BY
Charles J Worth
AGENT United States Patent Office 3,460,082
Patented Aug. 5, 1969

3,460,082
ELECTRICAL RELAY WITH ENCLOSURE CONNECTED TO THE MOTOR STRUCTURE THEREOF
Clarence Robert Stone, Princeton, Ind., assignor to American Machine & Foundry Company, a corporation of New Jersey
Filed Feb. 20, 1967, Ser. No. 617,345
Int. Cl. H01f 7/00; H01h 9/02, 13/04
U.S. Cl. 335—278                                10 Claims

ABSTRACT OF THE DISCLOSURE

An enclosed relay having a can engaging at one end the relay header and at the opposite end having improved means for securing the enclosure to the relay motor structure.

---

Various methods have been used and proposed for connecting an enclosure or can to relay structure. However, under severe vibration conditions it has been found that such connecting means eventually loosen or break permitting the relay motor to vibrate within and relative to the can which normally seriously effects relay operation. It also has been noted that the can may be inadvertently lost or removed, and the hermetic seal between the can and header may break where one has been provided. As shown in FIG. 9 of U.S. Patent 2,955,174 which was granted Oct. 4, 1960 to W. J. Richert, one method of connecting a can or enclosure to a relay is the provision of a frame member 50 having a plurality of tabs which extend through the end wall of a cover or can 85 and are then twisted and/or soldered. Enclosures have been riveted to relays as is shown in U.S. Patent 3,240,899 which was granted Mar. 15, 1966 to L. A. Rice, while U.S. Patent 3,102,974 which was granted Sept. 3, 1963 to R. H. Williams, Jr., discloses a relay in which the cover or enclosure is bonded to the header.

Accordingly, an object of the present invention is to provide a connection between an enclosure and the motor structure of a relay which will not loosen or break under very severe vibration conditions.

Another object of the present invention is to provide the foregoing connection utilizing an extension of a core of the relay coil which is provided to protrude through the closed end of the enclosure before forming the connection.

And another object of the present invention is to provide the foregoing connection in which means has been provided to permit assembly of the enclosure on the relay when there is misalignment between the cores of the coils and the header.

And still another object of this invention is to provide the foregoing connection to derive improved heat transfer from the motor to the case for heat dissipation.

This invention contemplates a relay having the combination comprising a header supporting electrical terminals and having a peripheral surface; a relay motor including a frame connected to the header, and at least one electromagnetic coil connected to the frame; the frame having a plate portion spaced from and substantially parallel to the header; the coil being disposed between the plate portion and the header, and having a core with one end thereof extending through the plate portion; a relay motor enclosure having an open end engaging the peripheral header surface, and a wall at its other end with an opening therethrough so oriented relative to the open enclosure end to pass the core end therethrough when the enclosure is assembled on to the relay and the open enclosure end engages the peripheral header surface; the opening being of a greater size than the core end passing therethrough for providing a gap therebetween an annulus of welding material encircling the core end and lapping the wall adjacent the opening to provide welding material removed by providing the gap; and the core end, annulus and wall adjacent the opening being welded together to connect the enclosure to the relay motor structure.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining limits of the invention.

FIGURE 1 is an elevational view of a relay with the enclosure thereof broken away to illustrate the present invention, FIGURE 2 is a sectional view taken on line 2—2 of FIG. 1 with the header of the relay shown in end elevation after welding, FIGURE 3 is a view similar to FIGURE 2 illustrating a relay having a modified header form immediately after the enclosure applied thereto, FIGURE 3A is a sectional view similar to the upper portion of FIGURE 3 illustrating a modification thereof, FIGURE 4 is a view similar to FIGURES 2 and 3 illustrating a relay having still another modified header form immediately prior to welding, and FIGURE 5 is a plan view of a relay in which one core connection is in the state of formation as shown in FIGURE 3 and the other core connection is in the state of formation as shown in FIGURE 4.

Referring now to FIGURES 1 and 2, the relay shown is of the type illustrated in FIGURE 1 in the aforementioned Richert patent. However, the present invention is equally applicable to a relay as shown in FIGURE 9 of the same patent or to a single coil relay as is shown in the aforementioned Reiss patent.

The illustrative relay is provided with a motor structure 10 having a frame comprised of a pair of legs 11 (only one being shown) which are connected to one another at three corresponding ends by a plate 12. It should be understood that legs 11 and plate 12 providing the motor frame may of composite construction as shown or of unitary construction as is frame 50 shown in FIGURE 9 of the Richert Patent 2,955,174. A pair of electromagnet coils 13 are spaced from one another each being connected to the plate 12 by one end of its core 14. Cores 14 are disposed substantially parallel to one another and substantially normal to the plane of plate 12. A permanent magnet 17 is provided between coils 13 which is connected to plate 12 and centrally supports a motor armature 18 which extends across the free ends of the cores 14 opposite from the core ends connected to the plate 12.

The ends of arms 11 opposite from the ends connected to plate 12 are connected to a header 25 which carries terminal pins 27 to provide electrical connection to the coils 13 and the various relay contacts (all not shown). The header 25 is disposed in spaced, substantially parallel relationship with plate 12 and has a peripheral flange or skirt 26 which extends outwardly from the periphery and the outer surface thereof.

A relay enclosure or can 20 is provided to enclose the motor 10 and has an open end 21 which engages the skirt 26 of header 25. The open end 21 of can 20 and skirt 26 of header 25 may be soldered, welded or otherwise bonded together to provide a seal therebetween, if so desired, by any suitable means well known in the art. The end of enclosure or can 20, opposite from the open end 21, is closed by a wall 22 to be welded as at 30 to the motor 10. More specifically, a pair of openings 23 are provided spaced from one another each being sufficiently large to pass an end of one of the cores therethrough. The alignment or orientation of openings 23 relative to each other and to the wall of enclosure 20 defining the open end 21 must correspond to the alignment of cores 14 relative to each other and the orientation thereof relative to skirt 26 provided by the peripheral surface of header 25.

Referring specifically to FIGURE 3, the core 14 of each coil 13 has a first reduced portion 15 which extends through and is fixedly connected to plate 12 by staking or any other suitable means well known in the art. A second reduced portion 16 of each core 14 extends from the first reduced portion 15 thereof and through an opening 23 provided in the end wall 22 of relay can 20. In this instance, a modified header 25A has a retroverted peripheral flange 26 which forms a socket in which the open end 21 of can 20 is received. It should be noted that each opening 23 in the end wall 22 is to be substantially larger than the reduced core end portion 16 which extends therethrough such that any misalignment between the cores 14 or one such core and the header 25 or 25A will cause no interference to prevent assembly.

As shown in FIGURE 4, an annulus of welding material 24 then is placed on the reduced end portion 16 of a core 14 and overlaps the opening 23 in end wall 22 through which the core extends. This insures sufficient welding material to provide the desired welded bond or connection 30 between a core 14 and the end wall 22 of the can 20 as shown in FIGURES 1 and 2. A further modified header 25B is shown in FIGURE 4 and has an outwardly extending flange 26B forming a peripheral groove or seat for the open end 21 of can 20.

It should be understood that the specific shape or construction of header 25 or modified headers 25A and 25B form no part of the invention except to provide a support for the electrical terminals, and means for engaging and closing the open end 21 of the can or enclosure 20. The interconnection formed between the open end 21 of can 20 and header 25, 25A or 25B may be merely a press fit or may be sealed as dictated by the relay requirements.

By providing openings 23 oversized relative to the core ends 16 which extend therethrough, misalignment in a direction transverse to cores 14 between any two or more of the cores 14, openings 23 or header 25, 25A or 25B will not prevent assembly of the can or enclosure 20 on to the relay. The rings of welding material 24, applied to each core end 16 and which overlaps the opening 23 through which the core end extends, replaces material removed by providing oversized openings. The rings 24 also facilitate welding by removing the necessity of making the melt from the core end 16 and the wall 22, during welding, filling or spanning the annular gap.

Referring particularly to FIGURE 3A, to attain a weld wholly within the periphery of the can 20, a modified motor frame 12A may be dimpled or countersunk as shown. The upper surface 22 of can 20 has one or more oversized openings 23 and is dimpled inwardly as at 23A to move the opening inwardly toward frame 12a. A modified core 14A is provided for each coil assembly and has a reduced portion 15A which corresponds to and is axially shorter than portion 15 of core 14. The resulting weld as described above will now be formed within the dimple 23A.

Although but several embodiments of the invention have been illustrated and described in detail, it is to be expressly understood that the invention is not limited thereto. Various changes may also be made in the design and arrangement of the parts without departing from the spirit and scope of the invention as will now be understood by those skilled in the art.

I claim:
1. In relay, the combination comprising:
a header supporting electrical terminals and having a peripheral surface;
a relay motor including a frame connected to the header, and at least one electromagnetic coil connected to the frame;
said frame having a plate portion spaced from and substantially parallel to the header;
said coil being disposed between the plate portion and the header, and having a core with one end thereof extending through the plate portion;
a relay motor enclosure having an open end engaging the peripheral header surface, and a wall at its other end;
said wall having an oversized opening relative to the core end and so oriented relative thereto and to the open enclosure end to pass the core end therethrough when the enclosure is assembled on to the relay and the open enclosure end engages the peripheral header surface; and
the core end and the wall adjacent the opening being welded together connecting the enclosure and the enclosed relay motor.

2. The relay in accordance with claim 1, wherein:
the core end is connected to the plate portion for connecting coil to the frame.

3. The relay in accordance with claim 1, wherein:
said opening is of a greater size than the core end passing therethrough providing a gap between the wall adjacent the opening and the core end; and
an annulus of welding material encircling the core end and lapping the wall adjacent the opening to provide welding material for the core end and wall removed by providing the gap.

4. The relay in accordance with claim 1, wherein:
the core end is connected to the plate portion for connecting coil to the frame;
said opening is of a greater size than the core end passing therethrough providing a gap between the wall adjacent the opening and the core end; and
an annulus of welding material encircling the core end and lapping the wall adjacent the opening to provide welding material removed by providing the gap.

5. The relay in accordance with claim 1, wherein:
said relay motor further including another electromagnetic coil connected to the frame and being disposed between the plate portion and the header;
said other coil having a core with one end thereof extending through the plate portion;
said cores being disposed in spaced substantially parallel relationship with each other and substantially normal to the plate portion;
said wall having another opening so oriented relative to the open enclosure end to pass the other core end therethrough when the enclosure is assembled on to the relay and the open enclosure and engages the peripheral header surface; and
the other core end and the wall adjacent the other opening being welded together so both core ends welded to the wall connect the enclosure and the enclosed relay motor structure.

6. The relay in accordance with claim 5, wherein:
each of the core ends extending through the plate portion is connected thereto for connecting the coils to the frame.

7. The relay in accordance with claim 5, wherein:
at least one of said openings is of a greater size than the core end passing therethrough providing a gap between the wall adjacent such opening and core end; and
an annulus of welding material encircling the core end and lapping the wall adjacent the opening to provide welding material across the gap which was removed thereby.

8. The relay in accordance with claim 5, wherein:
each of said openings is of a greater size than the core end passing therethrough providing a gap between the wall adjacent each opening and the core end therethrough; and an annulus of welding material encircling each core end and lapping the wall adjacent the corresponding opening to provide welding material removed by providing the gaps.

9. The relay in accordance with claim 5, wherein:

each of the core ends extending through the plate portion is connected thereto for connecting the coils to the frame;

at least one of said openings is of a greater size than the core end passing therethrough providing a gap between the wall adjacent such opening and core end; and an annulus of welding material encircling the core end and lapping the wall adjacent the opening to provide welding material across the gap which was removed thereby.

10. The relay in accordance with claim 5, wherein:

each of the core ends extending through the plate portion is connected thereto for connecting the coils to the frame;

each of said openings is of a greater size than the core end passing therethrough providing a gap between the wall adjacent each opening and the core end therethrough; and an annulus of welding material encircling each core end and lapping the wall adjacent the corresponding opening to provide welding material removed by providing the gaps.

References Cited
UNITED STATES PATENTS 2,952,755  9/1960  Brinker et al. ____ 335—202 XR
2,955,174  10/1960  Richert _____ 335—80

GEORGE HARRIS, Primary Examiner

U.S. Cl. X.R.

335—202